United States Patent [19]

LeBlond et al.

[11] Patent Number: 4,903,531
[45] Date of Patent: Feb. 27, 1990

[54] ACOUSTIC GYROMETER

[75] Inventors: Henri LeBlond, Versailles; Philippe Herzog; Michel Bruneau, both of Le Mans, all of France

[73] Assignee: Badin-Crouzet, France

[21] Appl. No.: 239,300

[22] Filed: Sep. 1, 1988

[30] Foreign Application Priority Data

Sep. 1, 1987 [FR] France ............... 87 12124

[51] Int. Cl.$^4$ .............................................. G01P 9/00
[52] U.S. Cl. ....................................................... 73/505
[58] Field of Search ........................................... 73/505

[56] References Cited

U.S. PATENT DOCUMENTS 3,352,162 11/1967 Hart ....................................... 73/505
4,672,848 6/1987 Gohin et al. ......................... 73/505

FOREIGN PATENT DOCUMENTS 145534 6/1985 European Pat. Off. .

OTHER PUBLICATIONS

Swokowski, E. W., "Calculus with Analytic Geometry" p. 549 (1975).

Primary Examiner—Hezron E. Williams
Assistant Examiner—Robert P. Bell
Attorney, Agent, or Firm—Jacobs & Jacobs

[57] ABSTRACT

The gyrometer comprises a cavity filled with a fluid in the form of a body of revolution having an axis coinciding with the axis of a rotation to be measured. An excitation transducer and a measuring transducer are disposed on the wall of the cavity in a same cross section and offset at an angle of 90°. The excitation transducer excites a first acoustic resonance mode of the cavity and the measuring transducer measures a second mode of resonance induced by Coriolis forces when the cavity is subjected to the rotation to be measured. Such a gyrometer, less sensitive to mechanical embodiment inaccuracies, is assembled on, a moving body, for example, in order to measure its speed(s) of rotation.

4 Claims, 1 Drawing Sheet

ACOUSTIC GYROMETER

FIELD OF THE INVENTION

The present invention relates to an acoustic gyrometer comprising a cavity filled with a fluid, means for exciting a first acoustic resonance mode of said cavity, and means for measuring at least a second acoustic resonance mode of said cavity, induced by Coriolis forces when the cavity is subjected to at least one rotation to be measured, said rotation occuring around an axis of rotation.

Such a gyrometer, mounted on a moving body, makes it possible to measure the rotational speeds of this moving body around one or several reference axes.

BACKGROUND OF THE INVENTION

A gyrometer of the type defined above has already been introduced and is described in the French Pat. No. 2 554 225. In this patent, the cavity has the form of a right-angled parallelepiped and is disposed so that two of its faces parallel to each other are perpendicular to the axis of the rotation to be measured. The first resonance mode, namely the mode excited by the excitation means, is a mode in which the particulate acoustic velocities are all parallel and orthogonal to the axis of rotation. The second resonance mode, namely the one induced by Coriolis forces, is of the same type, i.e. whose particulate acoustic velocities are all parallel, but the direction of the velocities of the induced mode is orthogonal to the direction of the velocities of the excitation mode. In order that such a gyrometer functions with good performance, it is important that a certain number of conditions be satisfied. These conditions are more especially the following:

the distances between two faces parallel to each other and orthogonal to a resonance mode must be strictly equal to a integer number of half-wave lengths at the excitation frequency, this number generally being the same and this imposes that two dimensions of the cavity are strictly equal, even if automatic control of the excitation frequency is provided, the faces of the parallelepiped must be strictly parallel, and the transducers allowing for measurement of the induced mode must strictly be positioned in a node point of the excitation mode.

Generally speaking, the above conditions are not truly satisfied. In particular, if the distance between the two faces orthogonal to the particulate acoustic velocities of the excitation mode is not rigorously equal to the distance between the two faces orthogonal to the particulate acoustic velocities of the induced mode, the natural frequency of the excitation mode shall slightly differ from the natural frequency of the induced mode. If the excitation frequency is controlled by an automatic frequency control in order to equal the natural frequency of the excitation mode, the induced mode shall be excited at a frequency slightly different from its natural frequency, which shall originate measuring inaccuracies. Thus generally speaking, the performances of such a gyrometer with a parallelepiped cavity are extremely sensitive to the effects of mechanical embodiment imperfections.

SUMMARY OF THE INVENTION

This invention seeks to overcome the previous drawbacks by procuring a gyrometer less sensitive to the effects of mechanical imperfections than currently known gyrometers.

To this end, the present invention relates to a gyrometer of the type defined above, wherein said cavity is in the shape of a body of revolution having an axis, said axis coinciding with said axis of rotation and said excitation means including at least one excitation tranducer disposed on a wall of said cavity in a cross section plane of said cavity.

In this case, the excitation mode and the induced mode are azimuthal modes, that is whose particulate acoustic movement occurs according to concentric circles centered on the axis of the body, in other words in this case the axis of rotation, these circles being orthogonal to the axis. The pressure extrema of these azimuthal modes takes place, for each mode, on a line passing through the axis of rotation, and the two lines are orthogonal. In fact, these two modes appear like the orthogonal decomposition of the same partiulate movement, which results, without severe mechanical stresses, in the natural frequency of the induced mode being rigorously identical to the natural frequency of the excitation mode. Accordingly, the performances of the gyrometer are improved, especially as regards temperature performances and sensitivity.

Advantageously, said cavity has an axial dimension at most equal to the diameter of its largest cross section.

As a result, the natural frequencies of a large number of parasitical modes, likely to develop inside the cavity, are greater than the excitation frequency, and these parasitic modes, damped and thus attenuated at the excitation frequency, shall only slightly affect the signal measured by the measuring means. The sensitivity threshold of the gyrometer is then increased.

Advantageously, said cavity is an ellipsoid of revolution.

For a resonant cavity with an identical filling fluid and with equal volume, this shape obtains the highest quality factor. This also helps improve sensitivity.

BRIEF DESCRIPTION OF THE DRAWINGS

This invention shall be better understood by referring to the following description of the preferred embodiment of the gyrometer of the invention, as well as to the annexed drawings in which.

DETAILED DESCRIPTION OF THE PREFERRED EMBODIMENTS

Figure 1:
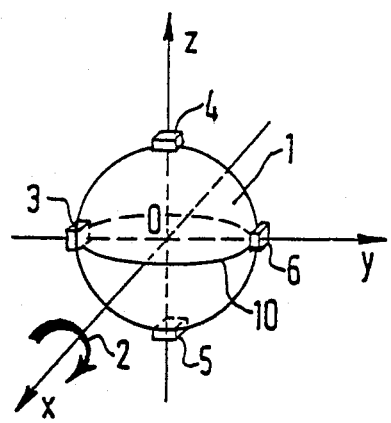
FIG. 1 shows a perspective view of the cavity of the gyrometer of the invention.

By referring to FIG. 1, an acoustic gyrometer for measuring the speed of rotation 2 around an axis Ox is now described.

The gyrometer includes a cavity 1 which here is a standard flattened ellipsoid of revolution, namely obtained by the rotation of an ellipse 10 around its small axis.

Figure 2:
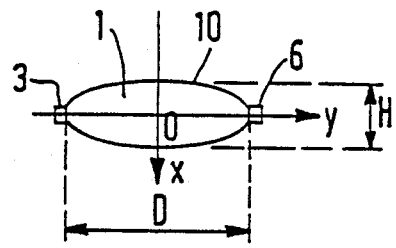
FIG. 2 shows a cutaway view of the cavity in the xOy plane of FIG. 1.

As shown in FIG. 2, which is a cutaway view of the cavity 1 in the xOy plane, O being the center of the ellipse and Oy an axis perpendicular at O to the axis Ox of the rotation 2 to be measured, the small axis of ellipse 10 extends along axis Ox and its length is H, whilst the large axis of ellipse 10 extends along axis Oy in FIG. 2, and has a length of D.

Figure 3:
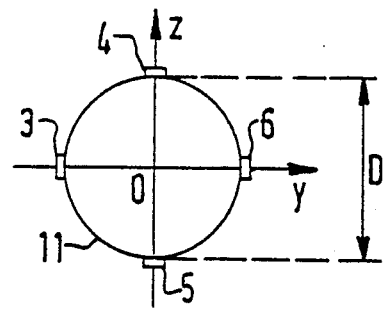
FIG. 3 shows a cutaway view of the cavity in the yOz plane of FIG. 1.

As shown in FIG. 3, which is a cutaway view of the cavity 1 in the yOz plane, Oz being an axis perpendicular at O to the axes Ox and Oy, the cross section 11 in the plane yOz is then a circle with a diameter D. This cross section is naturally the largest cross section of the body of revolution having Ox as an axis, which the cavity 1 represents.

The cavity 1 is filled with a fluid, in this instance with air.

A "loud speaker" type piezoelectric transducer 3 is disposed on the wall of the cavity 1 in a cross section plane of this cavity 1 and, in this instance, on the axis Oy. A "loud speaker" type piezoelectric transducer, as well known to one ordinary skilled in the art, is understood here to be a transducer which transforms an electric signal applied to it into an acoustic excitation of the fluid in which it is disposed. The excitation transducer 3 has very small dimensions compared to those of the cavity 1 and is subsequently regarded as a virtually pinpoint transducer.

Figure 4:
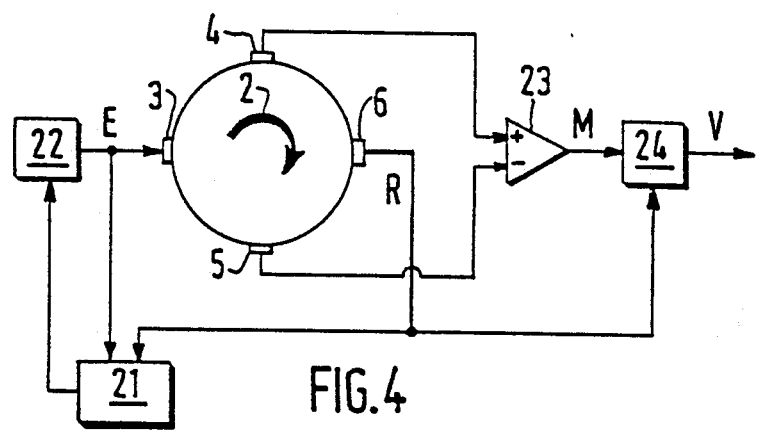
FIG. 4 shows a block diagram of the gyrometer of the invention, and, FIG. 5 diagrammatically shows the particular acoustic movement of an azimuthal mode.

"Microphone" type piezoelectric transducers, here numbering three and namely the transducers 4, 5 and 6, are disposed on the wall of the cavity 1 in the same cross section plane as the excitation transducer 3 so that the transducers 4 and 5 are 90° offset in relation to this excitation transducer 3, the transducer 6 being offset 180°. Thus, if, this being the case on the figures, the excitation transducer 3 is disposed on the negative half-axis Oy, the transducers 4 and 5 are respectively disposed on the positive half-axis Oz and on the negative half-axis Oz, whereas the transducer 6 is disposed on the positive half-axis Oy. A "microphone" type piezoelectric transducer, as well known to one ordinary skilled in the art, is understood to be a transducer which tranforms the acoustic pressure applied to it into an electric signal. One can say that such a transducer is an acoustic pressure measuring transducer. The measuring transducers 4, 5 and 6 have relatively small dimensions compared with those of the cavity 1 and they are subsequently regarded as virtually pinpoint transducers. The measuring transducers 4 and 5 here are matched, that is strictly identical. As shown in FIG. 4, the gyrometer also includes electronic circuits connected to the various transducers 3, 4, 5 and 6.

Thus, the output of a voltage-controllable oscillator 22 is connected to the input of the excitation transducer 3 and to a first input of a phase automatic control circuit 21. The output of the measuring transducer 6 is connected to the second input of the phase automatic control circuit 21. The output of the phase automatic control circuit 21 is connected to the control input of the oscillator 22.

The outputs of each of the measuring transducers 4 and 5 are connected to the inputs of a differential amplifier 23 whose output is connected to a synchronous detection circuit 24 which, on an auxiliary input, receives the output signal of the measuring transducer 6.

The gyrometer as just described functions as follows.

Figure 5:
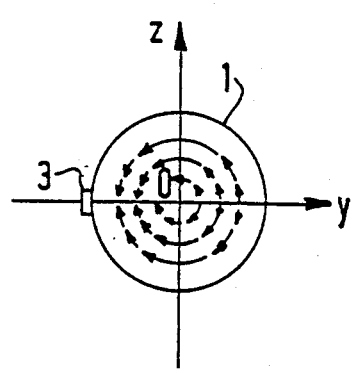

The oscillator 22 delivers an excitation signal E to the excitation transducer 3. This transducer excites inside the cavity an acoustic resonance mode of the type known as azimuthal. FIG. 5 on which, for reasons of simplicity, only the excitation transducer 3 has been represented, shows, for such an azimuthal mode, and using arrows, the particulate movement inside the cavity 1 at the particular moment when the negative half-axis Oy is the pressure maxima locus, whereas the positive half-axis Oy is the pressure minima locus. Naturally, when one half-period of the signal E has elapsed, the directions of the movements of the particles are inversed and the negative half-axis Oy is the pressure minima locus, whereas the positive half-axis Oy is the pressure maxima locus. Thus, it may be said that the excitation transducer 3 excites inside the cavity 1 an azimuthal resonance mode whose pressure extrema line is the axis Oy.

Naturally, this is valid, provided the frequency of the signal E is strictly equal to the resonance frequency of an azimuthal mode of the cavity 1. As this is known, such a frequency is related more especially to the dimensions of the cavity and the speed of acoustic waves in the filling gas, in this instance namely air. For details concerning the calculation of this frequency, reference should be made to the book by Robert D. BLEVIUS entitled "Formulae for natural frequencies and mode shape" 1986—Robert E. Krieger Editor, Malabar, USA.

So as to keep the frequency of the signal E equal to the resonance frequency of the cavity 1 independently of, especially and for example, the ambient temperature variations which may provoke variations of the dimensions of the cavity 1 and variations of the velocity of the acoustic waves in the filling gas, the phase automatic control circuit 21 controls the frequency of the oscillator 22 so that the phase between the reference signal R delivered by the measuring transducer 6 and the excitation signal E is always equal to 90°.

In these conditions, when the cavity 1 is subjected to the rotation 2, the Coriolis forces exerted on the particles excited result in the appearance of an azimuthal resonance mode whose pressure extrema line is perpendicular to that of the excitation azimuthal mode, namely directed according to the axis Oz. The amplitude of the pressure variations of the resonance mode induced by the Coriolis forces is proportional to the rotation speed 2.

The output signal M of the differential amplifier 23 represents pressure variations of the mode induced by the Coriolis forces since these variations are in phase opposition on the two measuring transducers 4 and 5, whereas the residual signal due to the excitation mode, basically identical as regards the measuring transducers 4 and 5, does not appear in the signal M.

The signal M, at the same frequency as the signal E, undergoes a synchronous detection in the circuit 24 which provides the signal V measuring the speed of the rotary movement 2.

The gyrometer according to the invention, as already explained elsewhere, is far less sensitive to the inaccuracies and mechanical variations as the gyrometers of the prior art owing to the fact that, because of the rotational symmetry around the axis of rotation, the frequency of the resonance mode induced by the Coriolis forces is of necessity identical to the excitation frequency. As a result, the level of the parasitic signals captured by the measuring transducers is extremely low.

Moreover, the Q-value of a cavity in the form of an ellipsoid of revolution is higher than that of a parallelepiped cavity of equal volume. This contributes in improving sensitivity.

Owing to the fact that the axial dimension H of the cavity is smaller than the diameter D of its largest cross section, the resonance modes likely to appear in the plane xOz have frequencies which are clearly larger than the resonance frequency of the azimuthal mode in the plane yOz which here again contributes in reducing the level of the parasitic signals likely to be captured by the measuring transducers 4 and 5.

Thus, with an elliptic cavity filled with air and whose large axis is 5 cm, the small axis being 3 cm and the resonance frequency being 4000 Hz, it is possible to obtain a Q-value of 250 and a sensitivity threshold corresponding to a rotation speed of 10° an hour.

This result is to be compared with that obtained with a cylindrical cavity, the resonance frequency for this being accessible via the formula:

$$f = C_o \lambda_i / 2\pi R$$

in which:
$C_o$ = acoustic waves velocity
R = radius of cylinder
$\lambda_i$ = 1.84948 (first root of the first type Bessel function $J'_1$).

In the case of a cavity with a radius where R=3 cm and a height H=4 cm, the resonance frequency is close to 4000 Hz, as for the above-mentioned elliptic cavity, but the coefficient is 150. This thus shows that the elliptic cavity results in a smaller spatial requirement and an improved sensitivity than the cylindrical cavity.

Naturally, the scope of this patent application is not restricted to the gyrometer just described.

In particular, the shape of the cavity 1 may be changed. This is why, in order to benefit from the main advantage procured by the invention, namely equality of the frequency of the mode induced by the coriolis forces and the frequency of the excitation mode, it merely needs that the cavity 1 be a body of revolution having Ox as axis. The symmetry of this body in relation to the plane yOz, if it generally facilitates mechanical embodiment, is not obligatory.

From all the possible forms, one should specially mention the sphere which is a body of revolution revolving around the axis Ox, the axis Oy and the axis Oz. In this case, with a single mode of azimuthal excitation having its pressure extrema line along the axis Oy produced by an excitation transducer like the preceding transducer 3, it is evident that it shall be possible to simultaneously measure the speed of rotation around the axis Ox and the speed of rotation around the axis Oz by respectively disposing, for example, a pair of measuring transducers on the axis Oz and a pair of measuring transducers on the axis Ox, respectively. The gyrometer thus embodied is then a biaxial gyrometer since it can measure two speeds of rotations of orthogonal axes. It would also be possible to embody a triaxial gyrometer by adding at least one excitation transducer in order to produce an azimuthal mode with its pressure extrema line along the axis Ox for example, and by carrying out a temporal multiplexing of the excitations and measurements.

It shall be observed, however, that, in the case of a cavity in the shape of a sphere or generally a cavity in the shape of a body of revolution whose axial dimension is roughly equal to, or indeed larger, than the diameter of the largest cross section, the natural frequencies of the modes in the plane xOz are roughly equal or even less than the natural frequency of the induced and azimuthal excitation modes, namely the excitation frequency of the signal E. As these modes have a tendency to appear as sources of parasitic signals with an intensity all the higher when their own frequency is close to the excitation frequency, the level of interferences may then be relatively high.

Thus, when one is looking to obtain good performances, it would be an advantage to select a "flattened" shape, namely one whose axial dimension is smaller than the diameter of the largest cross section, as the parasitic modes then inside the plane xOz have actual frequencies greater than the excitation frequency. Thus, they are damped at this frequency and their contribution to the level of the parasitic signals captured by the measuring transducers is reduced.

Amongst the flattened forms of revolution, the standard flattened ellipsoid of revolution, which has been described, procures a further advantage, since the Q-value of the cavity thus embodied is then maximal.

Of course, one would not depart from the context of the invention by changing the layout of the transducers 3, 4, 5 and 6. In particular, it is not obligatory to use one pair of matched measuring transducers like the transducers 4 and 5, a single transducer usuall being sufficient, certainly when the performances sought for are not particularly high and when the residual level remains low in relation to the signal to be measured. Similarly, the measuring transducer 6 and the phase automatic control circuit 21 are not absolutely essential, and it is possible to use other automatic control methods and, more generally, other methods for exciting the cavity on its resonant mode.

In the preceding description, the filling fluid was regarded as being air. However, this is not obligatory and the cavity may be filled with another type of fluid and especially a high molar mass gas, such as xenon or a heavy hydrocarbon, in order to reduce the dimensions of the cavity with a view to miniaturizing the device.

What is claimed is:

1. An acoustic gyrometer for measuring angular speed about an axis of rotation about which the gyrometer is rotated, comprising:
   (a) a cavity filled with a medium and rotatable about said axis of rotation;
   (b) means for exciting a first acoustic resonance mode in the medium within the cavity, said first mode having pressure extrema arranged on and along a first line which extends perpendicular to said axis of rotation;
   (c) means for measuring a second acoustic resonance mode induced by Coriolis force in the medium within the cavity when the cavity is rotated about said axis of rotation, said second mode having pressure extrema arranged on and along a second line which extends perpendicular to said first line; and
   (d) said cavity having a shape of a body of revolution rotated about said axis of rotation, said cavity having an axial dimension extending along said axis of rotation and a transverse dimension extending perpendicularly of said axis of rotation, said axial dimension being smaller than said transverse dimension and causing parasitical modes within the cavity to be damped, thereby increasing the sensitivity of the gyrometer.

2. The gyrometer according to claim 1, wherein the cavity has the shape of an ellipse as considered in a plane parallel to a plane in which the axis of rotation lies.

3. The gyrometer according to claim 1, wherein the exciting means includes at least one excitation transducer mounted on the cavity at a location remote from said axis of rotation, and wherein the measuring means includes a first measuring transducer mounted on the cavity in a common plane with said axis of rotation and said excitation transducer, and second and third measuring transducers lying in a plane which is perpendicular to said common plane.

4. The gyrometer according to claim 1, wherein the exciting means includes at least one excitation transducer mounted on the cavity at a location remote from said axis of rotation, and wherein the measuring means includes at least one measuring transducer lying in a plane which contains said axis of rotation and is perpendicular to a plane containing said axis of rotation and said excitation transducer.

* * * * *